(12) United States Patent
Taylor et al.

(10) Patent No.: US 7,391,734 B2
(45) Date of Patent: Jun. 24, 2008

(54) METHOD AND SYSTEM FOR OBTAINING LOGICAL PERFORMANCE DATA FOR A CIRCUIT IN A DATA NETWORK

(75) Inventors: William Scott Taylor, Duluth, GA (US); Thad June, Stone Mountain, GA (US)

(73) Assignee: AT&T Delaware Intellectual Property Corporation, Inc., Wilmington, DE (US)

( * ) Notice: Subject to any disclaimer, the term of this patent is extended or adjusted under 35 U.S.C. 154(b) by 958 days.

(21) Appl. No.: 10/348,077

(22) Filed: Jan. 21, 2003

(65) Prior Publication Data

US 2004/0141464 A1    Jul. 22, 2004

(51) Int. Cl.
*H04L 1/00* (2006.01)
(52) U.S. Cl. .................. 370/242; 370/252; 370/249
(58) Field of Classification Search ............. 370/241, 370/242, 252, 244; 714/4; 709/201; 379/9.04
See application file for complete search history.

(56) References Cited

U.S. PATENT DOCUMENTS

| | | | | |
|---|---|---|---|---|
| 5,375,126 | A * | 12/1994 | Wallace | 714/712 |
| 6,147,998 | A * | 11/2000 | Kelley et al. | 370/395.1 |
| 6,269,401 | B1 * | 7/2001 | Fletcher et al. | 709/224 |
| 6,556,659 | B1 * | 4/2003 | Bowman-Amuah | 379/9.04 |
| 6,716,165 | B1 * | 4/2004 | Flanders et al. | 600/301 |
| 6,829,223 | B1 * | 12/2004 | Richardson et al. | 370/241 |
| 6,981,039 | B2 * | 12/2005 | Cerami et al. | 709/223 |
| 6,990,616 | B1 * | 1/2006 | Botton-Dascal et al. | 714/715 |
| 7,120,819 | B1 * | 10/2006 | Gurer et al. | 714/4 |
| 2002/0072358 | A1 * | 6/2002 | Schneider et al. | 455/423 |
| 2003/0043753 | A1 * | 3/2003 | Nelson et al. | 370/249 |
| 2003/0128692 | A1 * | 7/2003 | Mitsumori et al. | 370/352 |

OTHER PUBLICATIONS

Don Ryan, The Telco Handbook For New Technicians—An Introduction To Telco Technology And Troubleshooting, Oct. 27, 2000, http://www.darkwing.net/aaron/telco.doc (as accessed on Nov. 2, 2006), p. 40.*

Don Ryan, The Telco Handbook for New Technicias, An Introduction to Telco Technology and Troubleshooting, Oct. 27, 2000, Section "5 Advanced Troubleshooting", Subsection "5.1 Advanced Frame Relay PVC", Test Step "9. to get this information . . . ".*

* cited by examiner

*Primary Examiner*—Kwang B. Yao
*Assistant Examiner*—Andrew Lai
(74) *Attorney, Agent, or Firm*—Merchant & Gould

(57) ABSTRACT

A method and system are provided for obtaining logical performance data for a network circuit in a data network. The network circuit includes both a logical circuit and a physical circuit. A legacy physical element module sends a request for logical performance data to a logical element module through a network management module in communication with the legacy physical element module and the legacy physical element module. Based on the request, the logical element module retrieves the logical performance data from one or more network devices in the network and transmits the data to the legacy physical element module through the network management module. Upon receiving the logical performance data, the legacy physical element module uses the performance data to troubleshoot the physical circuit. The network device may be a switch. The circuit may be a frame relay circuit or an ATM circuit.

19 Claims, 2 Drawing Sheets

METHOD AND SYSTEM FOR OBTAINING LOGICAL PERFORMANCE DATA FOR A CIRCUIT IN A DATA NETWORK

TECHNICAL FIELD

The present invention relates to obtaining logical performance data for a circuit in a data network.

BACKGROUND

Data networks contain various network devices, such as switches, for sending and receiving data between two locations. For example, a frame relay network contains interconnected network devices that allow data packets to be channeled over a circuit through the network from a host to a remote device. For a given network circuit, the data from a host location is delivered to the network through a physical circuit such as a T1 line that links to a switch of the network. The remote device that communicates with the host through the network also has a physical circuit to a switch of the network. The communication path between the switches associated with the host and the remote device that passes through the network is a logical circuit. A host may have many logical circuits, such as permanent virtual circuits (PVCs) or switched virtual circuits (SVCs), linked to many remote locations. For example, a PVC in a frame relay network sends and receives data packets through the same path leading to the switch of the remote device's physical connection The switches in data network are generally in communication with one or more legacy logical and physical element modules. For example, in a frame relay network, a legacy logical element module communicates with a switch to instruct the switch to function as a logical port in the network. The switches of the network send data packets to particular destinations and thereby create logical circuits in response to the information provided by the legacy logical element module. Because the legacy logical element module has access to the switches, it also has access to some of the logical performance data recorded by each switch for the logical circuit in the data network.

To properly maintain the network it is necessary for technicians to troubleshoot the network circuit. Technicians may utilize the legacy logical element module to troubleshoot the logical circuit portion of the network circuit by accessing the logical performance data from one or more switches. After troubleshooting the logical circuit, technicians at the legacy physical element module troubleshoot the physical circuit, which in most cases requires taking the network circuit out of service to test the physical circuit. However, there is certain logical performance data concerning the performance of the logical circuit which is recorded by the switch but which is not currently accessible by the legacy logical element module. Moreover, currently the logical performance data recorded by the switches in the data network is not accessible by the legacy physical management module. As a result of the legacy physical element module not having access to the logical performance data, there may be instances where the network circuit is unnecessarily taken out of service.

Therefore, there is a need for an interface to obtain all of the logical performance data recorded by a switch to improve troubleshooting network circuits in a data network.

SUMMARY OF THE INVENTION

Embodiments of the present invention provide for a method and system for obtaining logical performance data for a network circuit in a data network. The network circuit includes both a logical circuit and a physical circuit. A legacy physical element module sends a request for logical performance data to a logical element module through a network management module in communication with the legacy physical element module and the legacy physical element module. Based on the request, the logical element module retrieves the logical performance data from one or more network devices in the network and transmits the data to the legacy physical element module through the network management module. Upon receiving the logical performance data, the legacy physical element module uses the performance data to troubleshoot the physical circuit to maintain the network circuit.

The various aspects of the present invention may be more clearly understood and appreciated from a review of the following detailed description of the disclosed embodiments and by reference to the drawings and claims.

DETAILED DESCRIPTION

Figure 1:
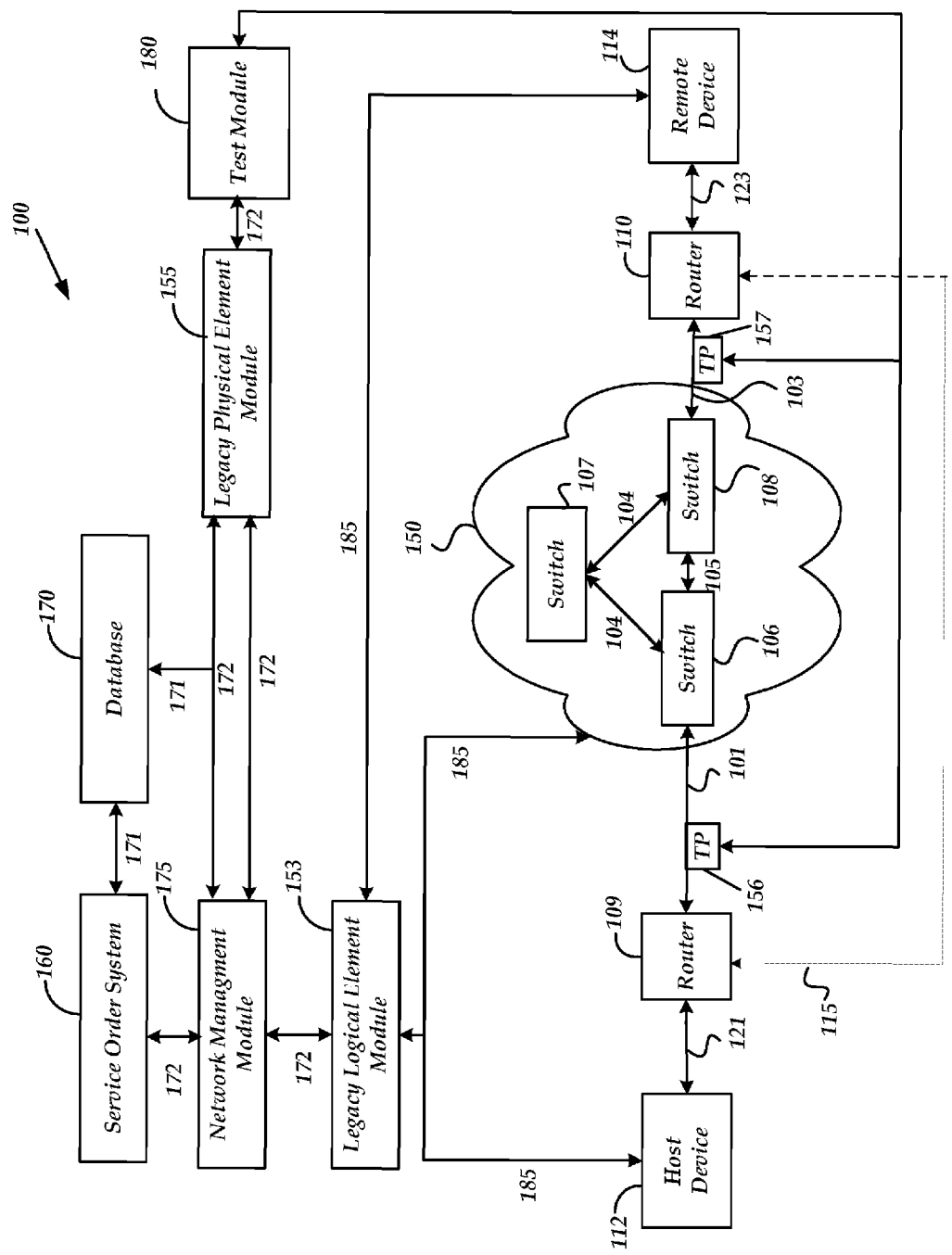
FIG. 1 shows a networked environment including a data network and a management system in accordance with an illustrative embodiment of the present invention.

Embodiments of the present invention are generally employed in a networked environment 100 as shown in FIG. 1. The networked environment 100, includes a data network 150, which contains one or more interconnected network elements, such as switches 106, 107, and 108, for transmitting data. The data network 150 may be a frame relay network. In one embodiment, the switches 106, 107, and 108 may be data packet switches. It will be appreciated that the data network may also contain other interconnected network devices and elements (not shown) such as digital access and cross connect switches (DACS), channel service units (CSUs), and data service units (DSUs).

The data network 150 channels data using a network circuit 115 between a host device 112 and a remote device 114. The network circuit 115 includes a physical circuit and a logical circuit. As used in the foregoing description and the appended claims, a physical circuit is defined as the physical path that connects the end point of a network circuit to a network device. For example, in the networked environment 100 of FIG. 1, the physical circuit of the network circuit 115 includes the physical connection 101 between the router 109 and the switch 106 as well as the physical connection 123 between the router 110 and the remote device 114. Routers 109 and 110 carry the physical signal from the end devices 112 and 114 over the connections 101 and 103 to the network 150. The routers 109 and 110 are connected to host devices 112 and 114 by links 121 and 123 respectively. The routers 109 and 110 may be local area network (LAN) routers, LAN bridges, hosts, front end processors, Frame Relay Access Devices (FRADs), or any other device with a frame relay or network interface. It should be appreciated that the host devices may be configured to serve as routers (thus eliminating the need for the routers 109 and 110). It should also be appreciated that a single router may be linked to multiple host devices. The physical connections 101 and 103 for the physical circuit may be any physical communications medium such as a 56 Kbps line or T1 line carried over a four-wire shielded cable or over a fiber optic cable.

As used in the foregoing description and the appended claims, a logical circuit is defined as a portion of the network circuit wherein data is sent over a communication data path between the first and last network devices in the data network. For example, in the networked environment 100 of FIG. 1, the logical circuit of the network circuit 115 may include the communication path 105 between the switches 106, 107, and 108 in the data network 150. In one embodiment, the logical path 105 may be a trunk for physically interconnecting the switches 106, 107, and 108. It should be understood that the actual path taken by data through the data network 150 is not fixed and may vary from time to time, such as when automatic rerouting takes place. For example, the logical circuit of the network circuit 115 may include the communication path 104 between the switches 106 and 108. It should be understood that no matter what path the data takes the beginning and end of the logical circuit (i.e., the switches 106 and 108) will not change. It will be appreciated that the data network 150 may contain additional switches or other interconnected network elements creating multiple paths between the switches 106, 107, and 108 defining the logical circuit in the data network. In the data network 150, the logical circuit may be either a permanent virtual circuit (PVC) remaining available to the network at all times or a temporary or switched virtual circuit (SVC) available to the network only as long as data is being transmitted.

In the networked environment 100, the network circuit 115 is established between the router 109 and the router 110 by channeling data packets or frames through the data network 150. In frame relay networks, each data frame sent from the host device 112 and the remote device 114 includes a header containing information, called a data link connection identifier (DLCI) which specifies the frame's destination, along with data. The header also includes specific bits for indicating the existence of congestion in the network and for discarding frames. In one embodiment, the logical circuit in the networked environment 100 may be provisioned with parameters for handling network congestion. These parameters may include a Committed Information Rate (CIR) and a Committed Burst Size (Bc). As is known to those skilled in the art, the CIR represents the average capacity of the logical circuit and the Bc represents the maximum amount of data that may be transmitted. The logical circuit may be provisioned such that when the CIR or the Bc is exceeded, the frame will be discarded by the receiving switch in the data network. It will be appreciated that the parameters for the logical circuit are not limited to the CIR and the Bc and that other parameters may be provisioned which are known to those skilled in the art. It should be understood that the embodiments of the present invention are not limited to frame relay networks but may also be implemented in other types of data networks such as asynchronous transfer mode (ATM) and native-mode local area networks.

The networked environment 100 may also include a signaling mechanism for determining the status of the logical circuit in the data network 150. In a frame relay network, the signaling mechanism may be in accord with a Local Management Interface (LMI) specification which provides for the sending and receiving of "status inquiries" between the network and an access device. The LMI specification includes obtaining status information through the use of special management frames with a unique DLCI address which may be passed between the network and the access device. These frames monitor the status of the connection and provide information regarding the health of the network. For example in the data network 150, the router 109 receives status information from the switch 106 in response to a status request sent in a special management frame. The LMI status information may include whether or not the logical circuit is congested or whether or not the network circuit is down. It should be understood that the parameters and the signaling mechanism discussed above are optional and that other parameters and mechanisms may also be utilized to obtain connection status information for a network circuit.

The networked environment 100 includes a service order system 160 for receiving service orders for provisioning network circuits. The service order includes information defining the transmission characteristics (i.e., the logical circuit) of the network circuit. The service order also contains the access speed, CIR, burst rates, and excess burst rates. The service order system 160 communicates the service order information to a network database 170 over management trunk 171. The network database 170 assigns and stores the parameters for the physical circuit for the network circuit such as a port number on the switch 106 for transmitting data over the physical connections 101 and 103 to the host device 112.

The network database 170 may also be in communication with an operations support system (not shown) for assigning physical equipment to the network circuit and for maintaining an inventory of the physical assignments for the network circuit. An illustrative operations support system is "TIRKS"® (Trunks Integrated Records Keeping System) marketed by TELECORDIA™ TECHNOLOGIES, Inc. of Morristown, NJ. The network database 170 may also be in communication with a Work Force Administration and Control system (WFA/C) (not shown) which is used to assign resources (i.e., technicians) to work on installing the physical circuit.

The networked environment 100 also includes a legacy logical element module 153 in communication with the switches 106, 108 and host device 112 and remote devices 114 through management trunks 185. The legacy logical element module 153 runs a network management application program to monitor the operation and retrieve data regarding the operation of the logical circuit established between switch 106 and switch 108 for the network circuit 115. The legacy logical element module may consist of terminals (not shown) that display a map-based graphical user interface (GUI) of the logical connections in the data network. An illustrative legacy logical element module is the NAVISCORE™ system marketed by LUCENT TECHNOLOGIES, Inc. of Murray Hill, N.J.

The networked environment 100 further includes a legacy physical element module 155. The legacy physical element module 155 runs a network management application program to monitor the operation and retrieve data regarding the operation of the physical circuit of the network circuit 115. The legacy physical element module is also in communication with the network database 170 for accessing information regarding physical circuits such as the line speed of the physical circuit. Similar to the legacy logical element module 153, the physical logical element module 155 may also consist of terminals (not shown) that display a map-based graphical user interface (GUI) of the physical connections in the data network. An illustrative physical element module is the Integrated Testing and Analysis System (INTAS), marketed by TELECORDIA™ TECHNOLOGIES, Inc. of Morristown, N.J., which provides flow-through testing and analysis of telephony services.

The legacy physical element module 155 troubleshoots the physical connections 101 and 103 for the physical circuit by communicating with test module 180 which interfaces with the physical connections via test access points 156 and 157. The test module 180 obtains the status of the physical circuit by transmitting "clean" test signals to test access points 156 and 157 which "loopback" the signals for detection by the test module 180. It should be understood that there may be multiple test access points on each of the physical connections 101 and 103 for the physical circuit.

The networked environment further includes a network management module 175 in communication with the service order system 160, the network database 170, the legacy logical element module 153, and the legacy physical element module 155 through communications channels 172. The communications channels 172 may be on a local area network (LAN). The network management module 175 may include a terminal (not shown), which may be a general-purpose computer system with a display screen. The network management module 175 serves as an interface for implementing logical operations to provision and maintain network circuits in the networked environment 100. The logical operations may be implemented as machine instructions stored locally or as instructions retrieved from the legacy element modules 153 and 155. The network management module 175 may communicate with the legacy element management module 153 and the legacy physical element management module 155 using a Common Object Request Broker Architecture (CORBA). As is known to those skilled in the art, CORBA is an open, vendor-independent architecture and infrastructure which allows different computer applications to work together over one or more networks using a basic set of commands and responses. An illustrative routine illustrating the logical operations performed by the network management module 175 for obtaining logical performance data to maintain the network circuit is described below with reference to FIG. 2.

Figure 2:
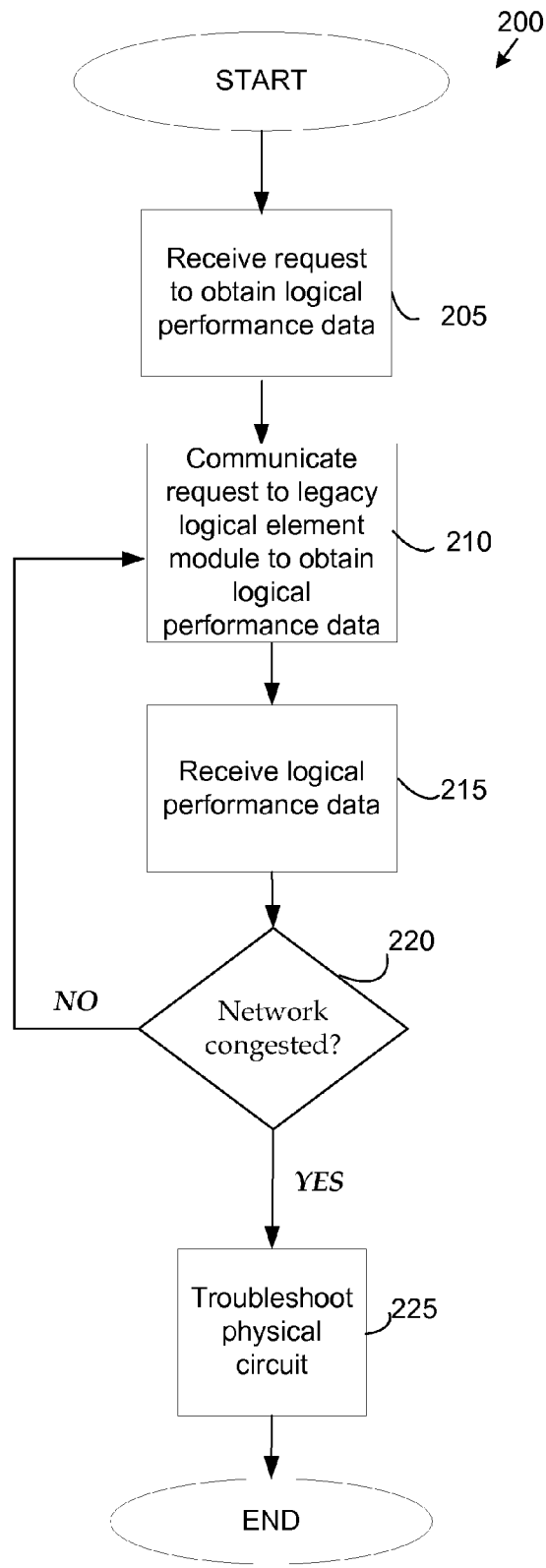
FIG. 2 shows an illustrative routine for obtaining logical performance data to perform on a network circuit in the networked environment shown in FIG. 1.

FIG. 2 shows an illustrative routine method 200 for obtaining logical performance data to maintain the network circuit 115 in the networked environment 100. The routine 200 begins at block 205 wherein, in response to a reported problem, the legacy physical element module 155 obtains the physical circuit information (e.g., port information) from the network database 170 and sends a request to network management module 175 to obtain the logical performance data for the network circuit 115.

The routine 200 continues to block 210, upon receiving the request from the legacy physical management module 155, the network management module 175 sends a request to the logical element module 153 (or directly to a switch, such as switch 106) to obtain logical performance data for the logical circuit. At block 215, the network management module 175 retrieves the logical performance data. The retrieved logical performance data may include the frame size, frame rate, and the octet condition (i.e., green, red, or yellow) for the logical circuit.

At block 220, the network management module 175 examines the logical performance data to determine the condition of the logical circuit and determines whether the legacy physical element module 155 can safely test the network circuit 115 by taking it out of service without losing data. For example, if the logical performance data includes red octets, the logical circuit is communicating data above the CIR and may be causing network congestion. If the logical performance data indicates that the logical circuit is congested, then the network management module 175 will communicate the logical performance data to the legacy physical element module 155 and instruct it to test the physical circuit at block 225.

The legacy physical element module 155 tests the physical circuit by communicating a request to the test module 180 to access a loop-able test point 156 or 158 on one of the routers 109 or 110. The tests may consist of determining whether the test module 180 can detect a clean signal that it transmits out to the loop-able test point. It will be appreciated that more detailed and advanced testing may also be performed by technicians using tools within the legacy physical element module 155 as well as other tools.

Conversely, if at block 220, the network management module 175 determines that the legacy physical element module 155 can not safely test the network circuit 155 (e.g., the data includes green octets), then the network management module 175 communicates again with the logical element module to determine if another logical circuit in the data network 150 has failed.

As discussed briefly above, the communications between the legacy physical element module 155, the network management module 175, and the logical element module 153 may be implemented using script files containing sets of commands and responses through a CORBA interface.

The network management module 175 enables the legacy physical element module 155 to obtain logical performance data from the logical element module 153. As a result, technicians at the legacy physical element module 155 are able to use the logical circuit data to troubleshoot network circuits without unnecessarily taking them out of service. Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for obtaining logical performance data for a network circuit in a data network, comprising:

obtaining logical performance data for the network circuit at a network management module, wherein the network circuit comprises a physical circuit and logical circuit and wherein the logical performance data comprises a frame size, a frame rate, and at least one of a green, red, and yellow octet condition for the logical circuit;

based on the logical performance data, determining whether data frames are being transmitted over the network circuit and determining whether the logical performance data may be used to troubleshoot the network circuit without unnecessarily taking the network circuit out of service by determining whether the logical performance data includes red octets or green octets;

if it is determined that the logical performance data includes red octets, then determining that the logical circuit is communicating the data frames above a Committed Information Rate (CIR), determining that the logical circuit is congested, and communicating the logical performance data to a physical element module for testing of the physical circuit by taking the network service out of service; and if it is determined that the logical performance data includes green octets, then determining that the physical element module can not safely test the network circuit by taking it out of service.

2. The method of claim 1, wherein the physical circuit comprises a physical path for the network circuit in the data network.

3. The method of claim 1, wherein the logical circuit comprises data describing a logical data path for the network circuit in the data network.

4. The method of claim 1, wherein the logical performance data includes errored packets.

5. The method of claim 1, wherein the logical performance data includes discarded eligible frames.

6. The method of claim 1, wherein the logical performance data includes current octet rate.

7. The method of claim 1, wherein the logical performance data includes maximum octet rate.

8. The method of claim 1, wherein the logical performance data includes minimum octet rate.

9. A system for obtaining logical performance data for a network circuit in a data network, comprising:

at least one network device having access to logical performance data for the network circuit, wherein the network circuit includes a logical circuit and a physical circuit, the logical performance data comprising a frame size, a frame rate, and at least one of a green, red, and yellow octet condition for the logical circuit;

a logical element module, in communication with the at least one network device, for retrieving the logical performance data;

a network management module for receiving the logical performance data from the logical element module operative to:

determine whether the logical performance data may be used to troubleshoot the network circuit without unnecessarily taking the network circuit out of service by determining whether the logical performance data includes red octets or green octets, if it is determined that the logical performance data includes red octets, then determine that the logical circuit is communicating data above a Committed Information Rate (CIR), determining that the logical circuit is congested, and communicate the logical performance data for testing of the physical circuit, wherein the physical circuit is tested by taking the network circuit out of service, and if it is determined that the logical performance data includes green octets, then determine that the network circuit can not be safely tested by taking the network circuit out of service; and a physical element module operative to:

send a request to the network management module for the logical performance data, receive the logical performance data from the network management module based on the logical performaance data, test the physical circuit by taking the network circuit out of service.

10. The system of claim 9, further comprising a test module, in communication with the physical element module, for accessing a test point in the at least one network device to troubleshoot the physical circuit.

11. The system of claim 9, wherein the network device is a switch.

12. The system of claim 9, wherein the network circuit is a frame relay circuit.

13. The system of claim 9, wherein the network circuit is an ATM circuit.

14. The system of claim 9, wherein the logical performance data includes errored packets.

15. The system of claim 9, wherein the logical performance data includes discarded eligible frames.

16. The system of claim 9, wherein the logical performance data includes current octet rate.

17. The system of claim 9, wherein the logical performance data includes maximum octet rate.

18. The system of claim 9, wherein the logical performance data includes minimum octet rate.

19. The system of claim 9, wherein the logical element module, the network management module, and the physical element module communicate with each other using script files containing sets of commands and responses through a Common Object Request Broker Architecture (CORBA) interface.

* * * * *